T X 3114R

United States

Henkler

[11] 3,890,041

[45] June 17, 1975

[54] ARRANGEMENT FOR EXPOSING PHOTOSENSITIVE MATERIALS WITH INFORMATION DISPLAYED ON THE SCREEN OF A CATHODE RAY TUBE

[75] Inventor: Herbert Henkler, Ludwigshafen, Germany

[73] Assignee: BASF Aktiengesellschaft, Ludwigshafen (Rhine), Germany

[22] Filed: Nov. 19, 1973

[21] Appl. No.: 417,258

[30] Foreign Application Priority Data

Nov. 21, 1972 Germany....................2256966

[52] U.S. Cl............... 355/18; 350/160 LC; 355/66; 355/71

[51] Int. Cl....... G03b 27/00; G02f 1/28; G02f 1/36

[58] Field of Search............ 355/11, 18, 65, 66, 71; 350/160 LC

[56] References Cited

UNITED STATES PATENTS

| | | | |
|---|---|---|---|
| 3,758,207 | 9/1973 | Letzer | 355/71 X |
| 3,764,211 | 10/1973 | Morse et al. | 355/71 |

*Primary Examiner*—Richard A. Wintercorn
*Attorney, Agent, or Firm*—Johnston, Keil, Thompson & Shurtleff

[57] ABSTRACT

An arrangement for exposing photosensitive material, especially the photopolymer coatings of printing plates, comprising the screen of a cathode ray tube with the information displayed thereon, an optical system and at least one liquid crystal cell for storing the information, and a light source for transferring the stored information to a photosensitive coating. In particular, an arrangement according to the invention greatly simplifies the exposure of photopolymer printing plates, and enables information reproduced successively on the screen of the cathode ray tube to be displayed simultaneously side by side.

5 Claims, 4 Drawing Figures

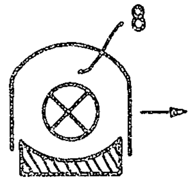
Fig.2a
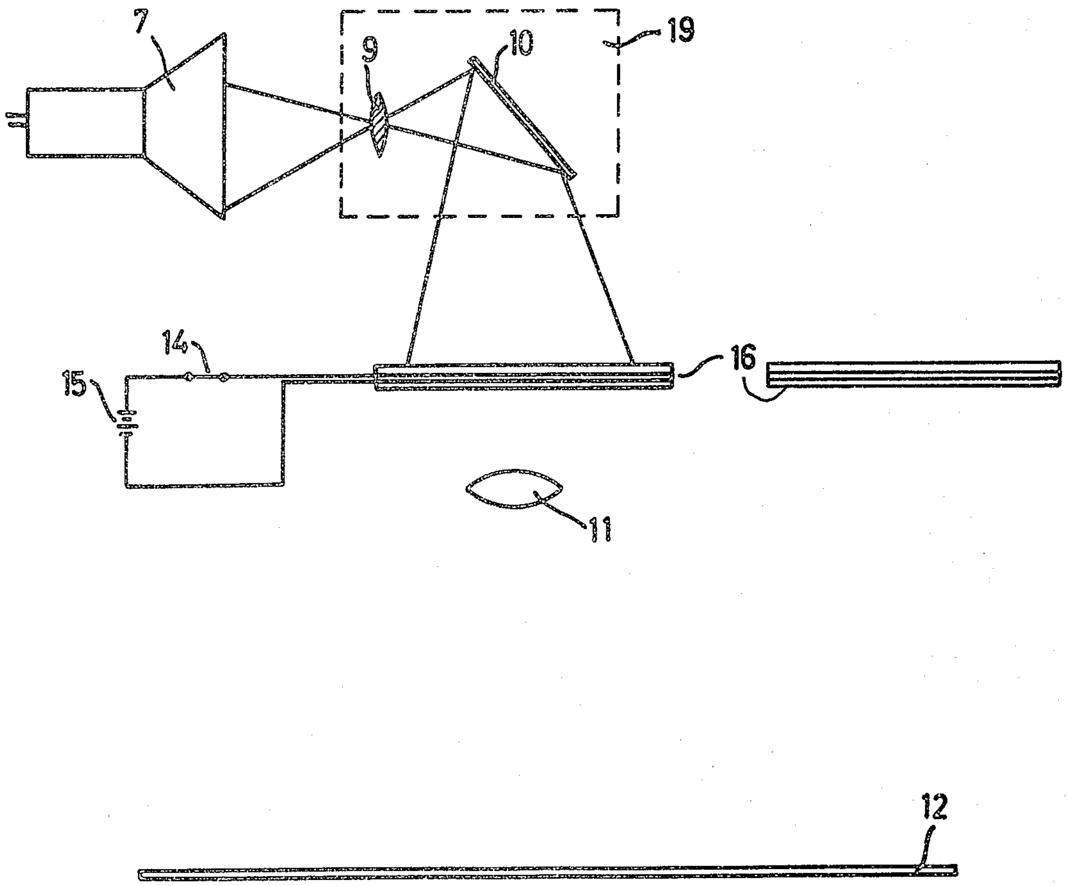

ARRANGEMENT FOR EXPOSING PHOTOSENSITIVE MATERIALS WITH INFORMATION DISPLAYED ON THE SCREEN OF A CATHODE RAY TUBE

This invention relates to an arrangement for exposing photosensitive material, especially photopolymer coatings for the production of printing plates, with the information displayed on the screen of a cathode ray tube, the arrangement comprising an optical system in front of the screen, at least one liquid crystal cell between the optical system and the photosensitive material and a light source arranged so as to expose the photosensitive material through the liquid crystal cell, the latter consisting of two transparent electrodes with one photoconductive layer and one liquid crystal layer situated therebetween.

BACKGROUND OF THE INVENTION

It is known to record information displayed on the screen of a cathode ray tube on suitable material by photographic methods. For example, photographic negatives for making printing plates or cylindrical printing forms by a method known as "photocomposition" are produced by exposing silver halide films with the information displayed on the screen of a cathode ray tube. The exposed films are then developed, fixed and washed and are ready for further processing after the silver halide emulsion has dried. During further processing, the photographic negatives are usually printed down on the printing plate - e.g. offset plate or photopolymer plate - in a suitable known exposure device, using a high-intensity light source emitting light of suitable wavelength.

It is also known to display the text and graphic output from a computer or a data storage unit on the screen of a cathode ray tube and to record this information on silver halide film on a reduced scale. This form of text output and data storage is known under the designation COM (Computer Output Microfilm). Microfilm recorders which perform this function have been in use for a number of years.

Up to now it has not been possible to replace silver halide film by other recording media, because the radiation emitted by the screen of a cathode ray tube is insufficient for exposing other recording media within a reasonable length of time. Any process aiming at the rationalization, acceleration and automation of printing plate or printed circuit production with the aid of CRT screens has always been handicapped by the need to produce film negatives, an operation which wastes both time and materials. The reason is of course that the photosensitivity of the materials used in photopolymerization, photodimerization, photocrosslinking and photodegradation processes, i.e. photoresists, offset coatings and photopolymer printing plates, is lower by several orders of magnitude.

German Published Application No. 2,154,150 has disclosed an image intensifier by means of which the information displayed on the screen of a cathode ray tube can either be re-displayed for a certain time on an enlarged scale on a larger screen or projected onto the photosensitive surface of a conventional photocopier, in order to obtain a large number of copies of the displayed information. The known image intensifier consists of a rigid assembly comprising a liquid crystal cell, an auxiliary light source, optical lens and mirror elements and a screen or a photosensitive surface. In the process of image intensification, light from the screen of a cathode ray tube, for example, is projected onto a first transparent electrode arranged on the side of the photoconductive layer of a liquid crystal cell, the information is inscribed in the liquid crystal layer by applying a dc voltage between the electrodes, the liquid crystal cell is then illuminated from the side of a second transparent electrode after the voltage to the auxiliary light source has been removed, and the image produced by light scatter at the liquid crystal layer is deflected by a mirror and projected onto the viewing screen.

In this known image intensifier, several lenses are arranged between the auxiliary light source and the mirror which focuses the light so that it reaches the liquid crystal cell through an aperture in the mirror. A projection lens is provided between the mirror and the viewing or copying screen. Consequently, this known image intensifier is very expensive because a large number of optical elements and an auxiliary light source are required, and is moreover not suitable for exposing every type of photosensitive material because the screen is merely illuminated with the light from the auxiliary light source which is reflected by the liquid crystal cell.

BRIEF SUMMARY OF THE INVENTION

An object of the present invention is to improve known arrangements for exposing photosensitive materials with the information displayed on the screen of a cathode ray tube, to simplify them and, in particular, to make them suitable for the production of printing plates.

This object is achieved with an arrangement for exposing photosensitive material, especially photopolymer layers for the production of printing plates, with the information displayed on the screen of a cathode ray tube comprising an optical system arranged in front of the screen, at least one liquid crystal cell between the optical system and the photosensitive material and a light source located so as to expose the photosensitive material through the liquid crystal cell, the latter consisting of two transparent electrodes between which a photoconductive and a liquid crystal layer are interposed, wherein the light source, during exposure of the photosensitive material, is located in a position in which the photoconductive layer is illuminated first, and the optical system and/or the liquid crystal cell and, possibly, the screen of the cathode ray tube or the light source are arranged so as to be movable relative to the photosensitive material.

The advantages offered by the arrangement of the invention stem mainly from the fact that it is possible, without having to produce a photographic negative, to directly transfer the information appearing on the screen of a cathode ray tube to printing plates or photosensitive layers having a lower sensitivity than a silver halide film. In this way considerable time is saved and, at the same time, film material costs are completely eliminated. Trouble due to faulty negatives (scratches, fog, pinholes, stains, creases) can no longer arise. The storage of optical information can be carried out using ordinary EDP media and access time is accordingly short. In the production of printing plates one gains the advantage of the flexibility offered by EDP processes, reflected, for example, in the free choice of type faces, type sizes and type area and in the rapid execution of corrections and last-minute amendments.

According to the invention, the radiation emitted by the screen of a cathode ray tube is not utilized directly for exposing the recording medium, but indirectly by means of a movable optical system which modifies the photoconductive layer of a liquid crystal cell in accordance with the original information. In this way, a liquid crystal image is produced which, in turn, is used directly in the exposure of the recording medium using a suitable powerful light source.

The arrangement of the invention may be used for exposing photosensitive materials, especially photoresists, diazo coatings, offset plates and photopolymer printing plates with the information displayed on the screen of a cathode ray tube. The arrangement may also be employed for making printing plates by photocomposition, for producing printed circuits and, generally, for exposing photosensitive coatings insufficiently sensitive or insensitive to the radiation emitted by the screen of a cathode ray tube.

In an advantageous embodiment of the arrangement of the invention, several liquid crystal cells may be juxtaposed in one plane, and the optical system may be movable relative to the liquid crystal cells while the screen of the cathode ray tube is stationary, so that a number of items of information displayed simultaneously or consecutively on the screen, are projected either simultaneously or consecutively and in spatial juxtaposition on the liquid crystal cells, are stored therein and transferred to the photosensitive material after the optical system has been removed from the space between the liquid crystal cells and the light source and after the latter has been switched on.

It is thus possible to expose in an advantageous manner large printing plates.

Conveniently, the optical system consists of at least one projection lens and/or at least one deflection mirror.

Preferably, the liquid crystal layer of the liquid crystal cell consists of a mixture of nematic and cholesteric liquid crystals in order to achieve long storage times.

The liquid crystal cell or cells may be arranged immediately adjacent to and above or, if desired, in direct contact with the material to be exposed. As a result, additional projection lenses between the liquid crystal cell and the exposed material are unnecessary.

BRIEF DESCRIPTION OF THE DRAWINGS

Further details of the invention are disclosed in the following description of the embodiments thereof illustrated in the accompanying drawings, in which.

DESCRIPTION OF THE PREFERRED EMBODIMENT

Figure 1:
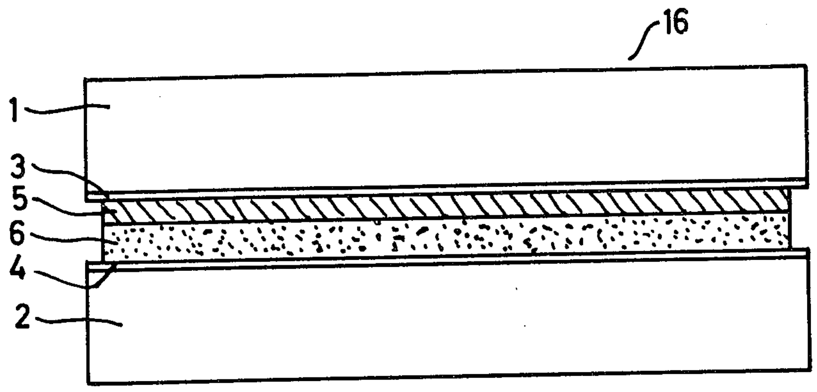
FIG. 1 shows a liquid crystal cell, FIG. 2*a* the arrangement of the invention in the position for irradiating juxtaposed liquid crystal cells, FIG. 2*b* the arrangement of FIG. 2*a* in the position for exposing a photopolymer printing plate.

For a better understanding of the invention, the abovementioned liquid crystal cell 16 (FIG. 1) will be described first. Such cells are already known and have been described, for example, in "Unconventional Photographic Systems", SPSE, Washington, 1971, Advance Printing, page 83. They consist of two sheets of glass 1 and 2, each of which has a light-transmitting, electrically conductive surface 3 and 4. The conductive layer 3 of plate 1 is provided with a further layer 5 consisting of a transparent photoconductive material. Between this layer 5 and the conductive surface 4 of the other sheet of glass there is a layer 6 of transparent liquid called "liquid crystal" and capable of changing its optical properties under the action of an electric field ( $\leq$ 1kHz) of specific strength. Liquid crystals generally change from the transparent state to a less translucent condition when an electric field is applied. If suitable substances are used, especially mixtures of nematic and cholesteric liquid crystals, the optical state produced by the electric field is maintained even after the field has been removed and remains stable for prolonged periods of time. Only after an ac field ( $\geq$ 1 kH) has been applied does the mixture return again to its original transparent state. Chemical compounds suitable for making liquid crystal mixtures include the following:

cholesteryl oleate
cholesteryl perlargonate
cholesteryl caprinate
cholesteryl benzoate
cholesteryl chloride
cholesteryl oleylcarbonate
cholesteryl methylcarbonate cholesteryl-4-carbomethoxyoxybenzoate
cholesteryl-4-cyanocinnamate
cholesteryl-4-ethoxybenzoate
cholesteryl-4-(2,2-ethoxy-ethoxy-carbethoxyoxy)-benzoate
cholesteryl-4-(2,2-ethoxy-ethoxy-carbethoxyoxy)-cinnamate
4,4'-azoxyanisole
4,4'-azoxyphenetole
terephthalaldehyde bix-(4-ethoxyphenylimine)
4-n-hexyloxycinnamic acid
4-(2,2-ethoxy-ethoxy-carbethoxyoxy)-cinnamic acid ester of 4-hydroxy-4'-methoxy-azobenzene
4-methoxy cinnamic acid ester of 4-hydroxy-4'-methoxy-azobenzene
bis-(4-butyloxyphenyl) terephthalate
MBBA, N-(p-methoxy-benzylidene)-p-n-butylaniline
EBBA, N-(p-ethoxy-benzylidene)-p-n-butylaniline Mixtures of for example MBBA (90% by weight) and cholesteryl derivates (10% by weight) have proved to be very suitable.

The surfaces of the sheets of glass used in the construction of the liquid crystal cell 16 are made electrically conductive by a thin layer of tin oxide or indium oxide.

The photoconductive layer 5 used in the liquid crystal cell 16 plays an important part. When the said layer is exposed to visible or ultraviolet light, its electrical resistance is changed, i.e. reduced. Suitable photoconductive materials are, for example, selenium, cadmium sulfide, cadmium selenide, zinc sulfide, zinc oxide and organic photoconductive materials such as polyvinyl carbazole and complexes of polyvinyl carbazole and 2,4,7-trintro-9-fluorenone.

If a photosensitive material, e.g. a photopolymer plate 12, is to be exposed in the arrangement of the invention, the information displayed on the screen 7 of the cathode ray tube is first projected on the photoconductive layer of the liquid crystal cell.

For this purpose a movable optical system 19 comprising at least one lens 9 and a deflection mirror 10 is employed. The projected information may either be on a smaller scale, on the same scale or on a larger scale and may be projected on any desired area of the photoconductive layer, depending upon the selection and arrangement of the elements of the optical system 19. One or more lenses 9 and deflection mirrors 10 may be arranged so as to be displaceable relative to one another and interchangeable within the optical system 17 to enable reductions or enlargements to be made. By moving the optical system 19 and/or the liquid crystal cell 16 and/or the screen 7 of the cathode ray tube, consecutively displayed information, for example single letters or words, may be inscribed next to each other in the liquid crystal cell, so that eventually whole words or sentences or pages are composed therein, i.e. produced by photocomposition. If large areas of photosensitive material are to be exposed, it is also possible to juxtapose a plurality of liquid crystal cells 16, such as is shown in FIG. 2*a* in order to obtain units which, for example, permit large printing plates 12 to be exposed. The CRT screen radiation and photoconductive layer 5 are correlated by selecting suitable screen phosphors and photoconductive materials. Under the action of the light emanating from the cathode ray tube, the electrical resistance of the photoconductive layer 5 in the liquid crystal cell 16 is varied in accordance with the transmitted information, i.e. the resistance decreases in the areas struck by light. If a dc or low-frequency ac voltage is applied to the electrodes 3 and 4 at the same time, an effective electric field corresponding to the image on the CRT screen is produced in the liquid crystal layer 6. As a result, the optical properties of the liquid crystal layer 6 vary according to the information transmitted from the screen 7 of the cathode ray tube. After the information has been transferred from the screen 7 of the cathode ray tube to the liquid crystal cell 16, the voltage applied to the liquid crystal cell 16 is removed. However, if a liquid crystal mixture is selected from the above-mentioned compounds, the liquid crystal cell 16 retains the transmitted information for an extended period of time. Following the removal of the applied voltage, the liquid crystal cell 16 is illuminated with a suitable light source 8, i.e. a source whose light wavelength and intensity are suitable for the short exposure of the sensitive material 12, from the side of electrode 3 which is provided with the photoconductive layer 5, and the information contained therein is transferred to the photosensitive material 12 to be exposed (e.g. offset plate, photopolymer printing plate, photoresist, diazo film). The stability of the image in the liquid crystal layer permits the use of high-energy, high brightness light sources 8, for example xenon arc lamps, carbon arc lamps, mercury vapor lamps, thus making it possible to expose even relatively insensitive materials such as diazo films, vesicular films, photoresist coatings, offset coatings or photopolymer printing plates within the time limits customary for such materials. To enhance contrast or to achieve reversal (positive to negative or vice versa), a schlieren optical system may be employed for the exposure of the photosensitive material.

In some cases it may be advisable to cool the liquid crystal cell 16 with a stream of air during exposure of the photosensitive material 12 in order to prevent the cell temperature from exceeding the operating range of the liquid crystal mixture employed.

Figure 3:
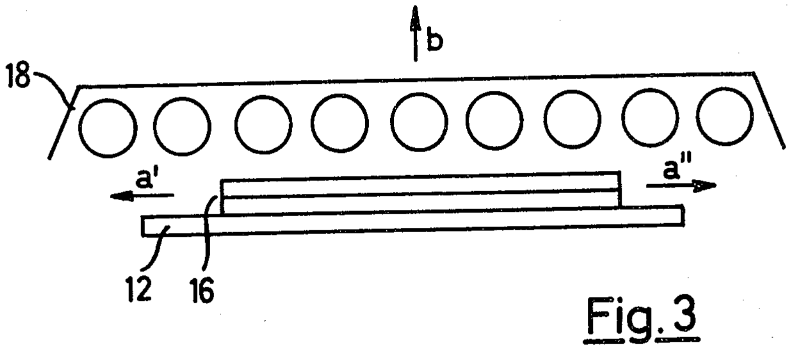
FIG. 3 shows another arrangement according to the invention.
Figure 2B:
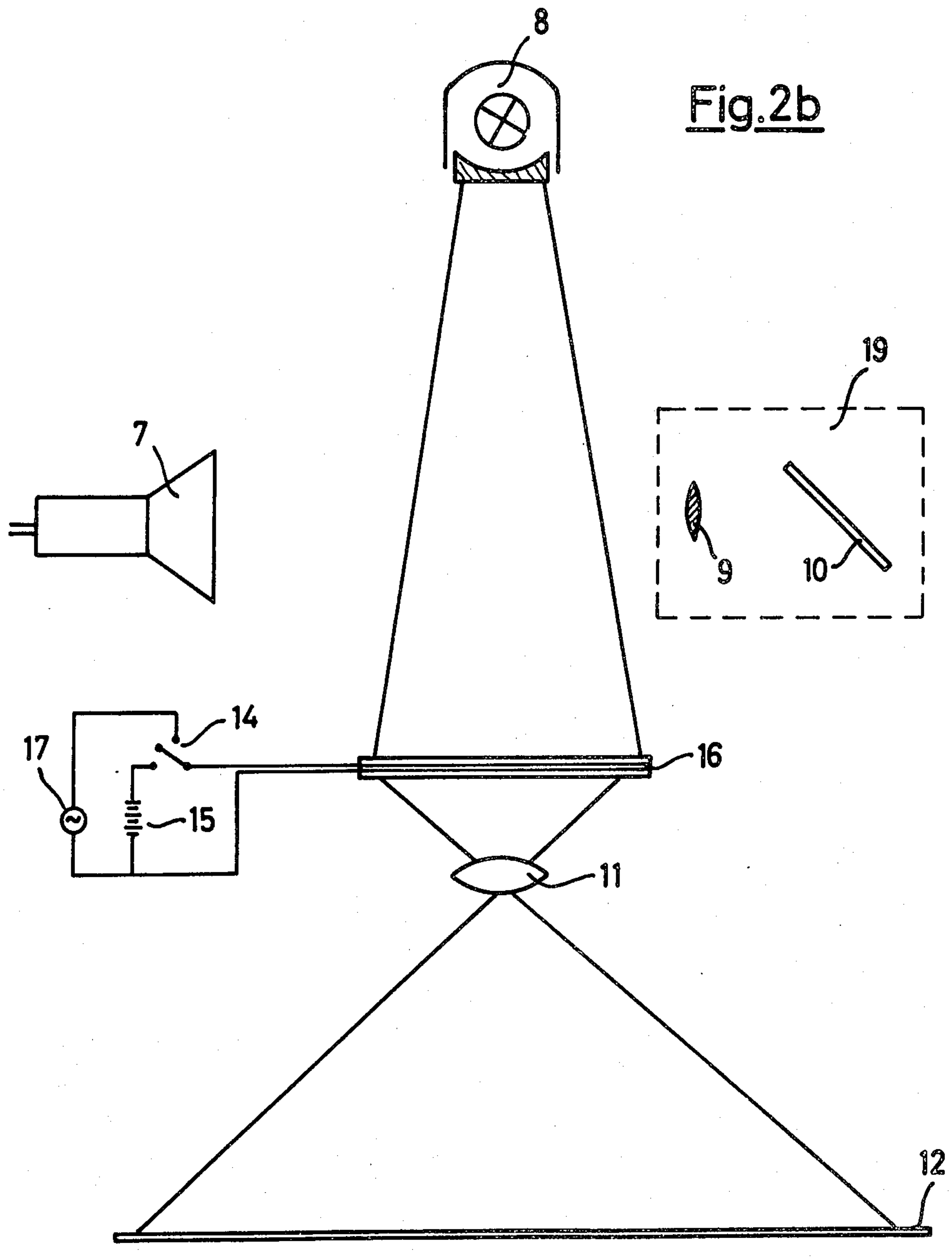

The essential elements of the device of the invention are illustrated in FIGS. 2*a*, 2*b* and 3.

The light rays emitted by the screen 7 of the cathode ray tube are projected on the liquid crystal cell 16 via the optical system 19, which may consist, for example, of projection lens 9 and a deflection mirror 10. The transparent electrode 1 (cf. FIG. 1) bearing the photoconductive layer 5 faces the source 7. Voltage from a source 15 is applied to the two electrodes 3 and 4 of the cell 16 when a switch 14 is closed.

After switching off the voltage source 15 (FIG. 2*b*) and removing the optical system 19 from the beam of light from the light source 8, the image stored in the liquid crystal cell 16 is illuminated by means of the light source 8 from the side of electrode 1 bearing the photoconductive layer 5 and is projected via an optical system 11 onto the photosensitive material 12.

When the photosensitive material 12 has been exposed, the image stored in the liquid crystal cell 16 is erased by switching over the switch 14 to an ac voltage source 17. When the optical system 19 is returned to its original position and voltage from the source 15 is again applied, the arrangement is ready for the next image transfer.

In another embodiment (FIG. 3), the light source 8 is replaced by a broad light source 18 and the transfer of the information contained in the liquid crystal cell 16 to the photosensitive material 12 takes place with the liquid crystal cell or cells in direct contact with the photosensitive material 12 (as shown) or immediately adjacent to and above the said material, no lens system 11 being interposed in either case. In this embodiment it is advisable either to arrange the liquid crystal cell 16, used for storing the information, in such a way that it is displaceable in the direction of one of the arrows *a'*, *a''* between the light source 18 and the photosensitive material 12, or to arrange the light source so as to be movable in the direction of arrow *b*, for example, to permit an optical system 19 to be positioned above the liquid crystal cell 16. Such an embodiment is preferred if the image of the liquid crystal cell is to be transferred to the photosensitive material on approximately the same scale and, at the same time, a certain amount of undercutting of the image in the liquid crystal layer is desired. The last-mentioned embodiment is employed preferably with reliefforming photosensitive materials, for example photopolymer printing plates for letterpress or indirect letterpress printing.

I claim:

1. Apparatus for exposing photosensitive material to information displayed on the screen of a cathode ray tube which comprises in combination:

a. a cathode ray tube having a screen with information thereon;

b. a plurality of coplanar juxtaposed liquid crystal cells, each of said liquid crystal cells comprising two transparent electrodes and a photoconductor layer and a liquid crystal layer interposed therebetween and having means for applying a potential across said electrodes to record information projected thereon;

c. an optical system arranged in front of said cathode ray tube whereby said information on said screen can be projected onto said liquid crystal cells; and d. light source means for exposing said photosensitive material to said information stored in said plurality of liquid crystal cells, at least one of said cathode ray tube and said optical system being movable relative to said liquid crystal cells so as to permit selective projection onto each said cell of said information on said screen, and at least one of said light source means, said optical system and said plurality of liquid crystal cells being movable relative to said photosensitive material so as to permit said light source means to expose said photosensitive material to said stored information.

2. The apparatus of claim 1 wherein said liquid crystal cells are arranged immediately adjacent to and above said photosensitive material.

3. The apparatus of claim 1 wherein said liquid crystal cells are arranged in contact with said photosensitive material.

4. The apparatus of claim 1 wherein said optical system comprises at least one projection lens and at least one deflection mirror.

5. The apparatus of claim 1 wherein said liquid crystal layer of said liquid crystal cells comprises a mixture of nematic and chloresteric liquid crystals.

* * * * *